United States Patent
Xie et al.

(10) Patent No.: US 7,072,309 B2
(45) Date of Patent: Jul. 4, 2006

(54) METHOD AND APPARATUS FOR DATA TRANSMISSION

(75) Inventors: Qiaobing Xie, Schaumburg, IL (US); Randall R. Stewart, Crystal Lake, IL (US); La Monte Henry Piggy Yarroll, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 906 days.

(21) Appl. No.: 10/025,521

(22) Filed: Dec. 17, 2001

(65) Prior Publication Data
US 2003/0115331 A1 Jun. 19, 2003

(51) Int. Cl.
*H04B 7/005* (2006.01)
(52) U.S. Cl. ............... 370/278; 370/252; 709/227; 714/749
(58) Field of Classification Search .............. 370/278, 370/229–231, 338, 328, 236, 445, 468, 474, 370/329, 282, 252; 714/749, 748; 710/104; 709/235, 227
See application file for complete search history.

(56) References Cited

U.S. PATENT DOCUMENTS

| | | | |
|---|---|---|---|
| 6,208,620 B1* | 3/2001 | Sen et al. | 370/231 |
| 2002/0114291 A1* | 8/2002 | Moulsey et al. | 370/328 |
| 2002/0191544 A1* | 12/2002 | Cheng et al. | 370/236 |
| 2003/0086403 A1* | 5/2003 | Harris et al. | 370/338 |

* cited by examiner

*Primary Examiner*—John Pezzlo
(74) *Attorney, Agent, or Firm*—Kenneth A. Haas; Steven A. May

(57) ABSTRACT

A method and apparatus for data transmission is provided herein. In accordance with the preferred embodiment of the present invention a loss-ratio estimator (105) estimates a current loss (L) for a communication channel (108). Once the actual loss for the channel is known, a generator (104) compares the actual loss (L) to a target loss (T). A retransmission control parameter (R) is then adjusted by the generator (104) and output to a transmitter 103 where it is used to control the retransmission behavior and to determine when to abort a bad frame. When a bad frame is aborted, transmitter 103 indicates the abortion to a receiving device (102). A receiver then utilizes the indication to stop reporting the bad frame in all subsequent ACK/NAKs.

14 Claims, 5 Drawing Sheets

METHOD AND APPARATUS FOR DATA TRANSMISSION

FIELD OF THE INVENTION

The present invention relates generally to data transmission and in particular, to a method and apparatus for data transmission within a communication system.

BACKGROUND OF THE INVENTION

Within a communication system, transmissions are conducted between a transmitting device and a receiving device over a communication resource, commonly referred to as a communication channel. To date, data transmissions have typically consisted of either a totally reliable data transfer protocol, or a totally unreliable data transfer protocol. Reliable data transmission protocols guarantee a lossless data transfer service, while unreliable data transfer protocols guarantee a "best effort" and are not capable of meeting specific loss requirements. An example of a reliable transmission protocol is the Transmission Control Protocol (TCP), while an example of an unreliable protocol is the User Datagram Protocol (UDP).

In many data transmission scenarios a user can afford some loss of data even though a totally unreliable transmission protocol (e.g., UDP) is unacceptable. That leaves the user with only one choice, namely, a totally reliable transmission protocol. For example, a user may be able to tolerate a maximum 10% loss in data transmission. Because UDP cannot guarantee a maximum loss, the user will be required to utilize a totally reliable transmission protocol (e.g., TCP). Since reliable transmission protocols are generally more expensive than unreliable transmission protocols, the user will be forced to pay a higher price for the totally reliable transmission protocol, even though the user can tolerate data loss. Notwithstanding this fact, the user is forced to occupy more bandwidth than is necessary. Therefore, a need exists for a method and apparatus for data transmission within a communication system that is less than totally reliable, yet offers more reliability than a totally unreliable transmission scheme and the level of reliability can be controlled by the user.

DETAILED DESCRIPTION OF THE DRAWINGS

To address the above-mentioned need, a method and apparatus for data transmission is provided herein. In accordance with the preferred embodiment of the present invention a loss-ratio estimator estimates a current loss (L) for a communication channel. Once the actual channel loss is known, a generator compares the actual loss (L) to a target loss (T). A retransmission control parameter (R) is then adjusted by the generator and output to a transmitter where it is used to control the current retransmission behavior of the transmitter.

Because the transmitter continuously adjusts a retransmission parameter based on the current channel condition, a specific user-defined QoS loss ratio can be maintained. Therefore, a user requiring a certain QoS can obtain that QoS without having to resort to a totally reliable transmission control protocol.

The present invention encompasses a method for data transmission. The method comprises the steps of receiving a first bad frame and/or detecting a first lost frame a first plurality of times, and sending a first number of Acknowledgments (ACKs) or Negative Acknowledgments (NAKs) in response to the received first bad or lost frames. The first bad or lost frame is aborted. A second bad or lost frame is received or detected a second plurality of times, and a second number of ACKs or NAKs is sent in response to the received second bad or lost frames. The second bad or lost frame is then aborted.

The present invention additionally encompasses a method for data transmission. The method comprises the steps of receiving an acknowledgment (ACK) or negative acknowledgment (NAK) and determining a loss ratio (L) based on the received ACK/NAK. The loss ratio is compared with a target loss ratio (T) and a retransmission parameter (R) is adjusted based on the comparison. The retransmission parameter comprises a number of times a particular frame is to be retransmitted prior to aborting the frame.

The present invention additionally encompasses an apparatus comprising a loss ratio generator having an ACK or NAK as an input and outputting an estimated channel loss (L) and a retransmission parameter generator having the estimated channel loss as an input and outputting a retransmission parameter (R) based on the estimated channel loss, wherein R comprises a number of retransmissions a frame undergoes prior to declaring the frame an aborted frame.

Finally, the present invention encompasses an apparatus comprising a receiver having a poor frame as an input or detecting a lost frame, and an ACK/NAK generator coupled to the receiver, the receiver outputting an ACK/NAK based on a targeted loss ratio (T), an actual channel loss ratio (L), and a retransmission parameter (R), wherein the retransmission parameter comprises a number of times a frame is ACK/NAKed prior to declaring the frame an aborted frame.

Figure 1:
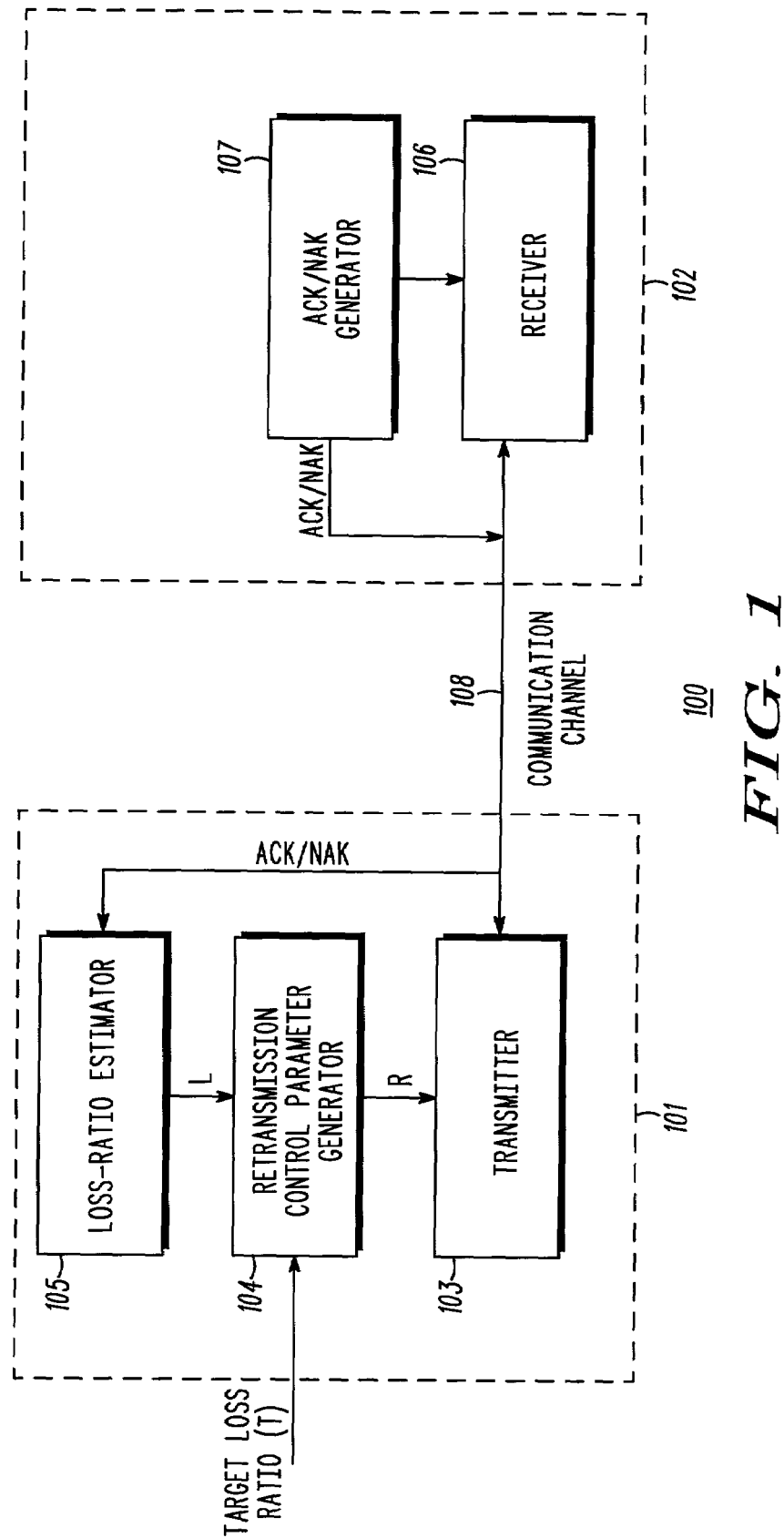
FIG. 1 is a block diagram of a communication system in accordance with the preferred embodiment of the present invention.

Turning now to the drawings, wherein like numerals designate like components, FIG. 1 is a communication system in accordance with the preferred embodiment of the present invention. In the preferred embodiment of the present invention, communication system 100 utilizes a Code Division Multiple Access (CDMA) system protocol as described in Cellular System Remote unit-Base Station Compatibility Standard of the Electronic Industry Association/Telecommunications Industry Association Interim Standard 95 (TIA/EIA/IS-95A), which is incorporated by reference herein. (EIA/TIA can be contacted at 2001 Pennsylvania Ave. NW Washington D.C. 20006). Although in the preferred embodiment of the present invention communication system 100 is a cellular communication system, in alternate embodiments communication system 100 may be any data communication system, such as, but not limited to, an Internet Protocol (IP)-based network.

Communication system 100 comprises transmitting device 101, which may be a base transceiver station (BTS) and receiving device 102, which may be a mobile unit. As shown, transmitter and receiver are communicating via communication channel 108.

Communication systems that request retransmission of data can be either Negative Acknowledgment (NAK) based, or Acknowledgment (ACK) based. For communication systems utilizing a NAK-based protocol, receiver 106 does not acknowledge correctly-received frames. Receiver 106 only requests the retransmission of frames that were missing or incorrectly received by sending a NAK to transmitting device 101. For communication systems using an ACK-based protocol receiver 106 acknowledges all good frames received. From these acknowledgments, transmitter 101 determines which frame(s) is lost or is incorrectly received.

In either a NAK-based or ACK-based communication system, once transmitter 101 determines that a particular frame is lost or not correctly received by receiver 106, the transmitter performs a retransmission of the frame and records the total number of retransmissions applied to the frame so far. After a predetermined number retransmissions (R), and if the frame has not been correctly received by the receiver, the transmitter aborts the retransmission of the bad frame and instructs the receiving device 102 that the frame has been aborted.

In the preferred embodiment of the present invention for both ACK and NAK-based systems, retransmission control parameter generator 104 controls the number of retransmissions (R) of bad frames to target a specific loss ratio (T). More particularly, the user of the communication system specifies a target Quality of Service (QoS) loss ratio. This can be done on a per-call basis, or apriori, based on a user's service agreement. Once transmitting device 101 receives the target loss ratio (T), transmitting device 101 continuously computes a loss ratio (L) based on information carried in the NAKs or ACKs received by loss-ratio estimator 105. In the preferred embodiment of the present invention the loss ratio is simply the number of lost or incorrectly received frames divided by the total number of frames sent during a predetermined time period (e.g., the last 10 seconds). More particularly, $$L = \frac{\text{Number of poor frames received in last 10 seconds}}{\text{Total number of frames transmitted in last 10 seconds}}.$$

Once the loss ratio is known, generator 104 compares the target loss ratio to the actual loss ratio and adjusts the retransmission control parameter (R) accordingly. In particular, if:

L>T then R is increased,
L<T and R>0 then R is decreased,
L~T then R is unchanged.

Specifically, if:
L>T then R is increased by 1,
L<T and R>0 then R is decreased by 1,
L~T then R is unchanged.

It should be noted that for the above logic, R can be decreased to a minimum of 0. When R is 0, transmitter 103 will not retransmit a frame even if it is indicated as lost.

Because transmitter 101 serves to maintain a specific user-defined QoS loss ratio, a user requiring a certain QoS can obtain that QoS without having to resort to a totally reliable transmission control protocol. Because of this, the bandwidth resource of communication channel 108 which is often shared with other users can be saved and the additional data delay often associated with a totally reliable transmission control protocol can be avoided.

Operation of Communication System Using a NAK-Based Protocol

Figure 2:
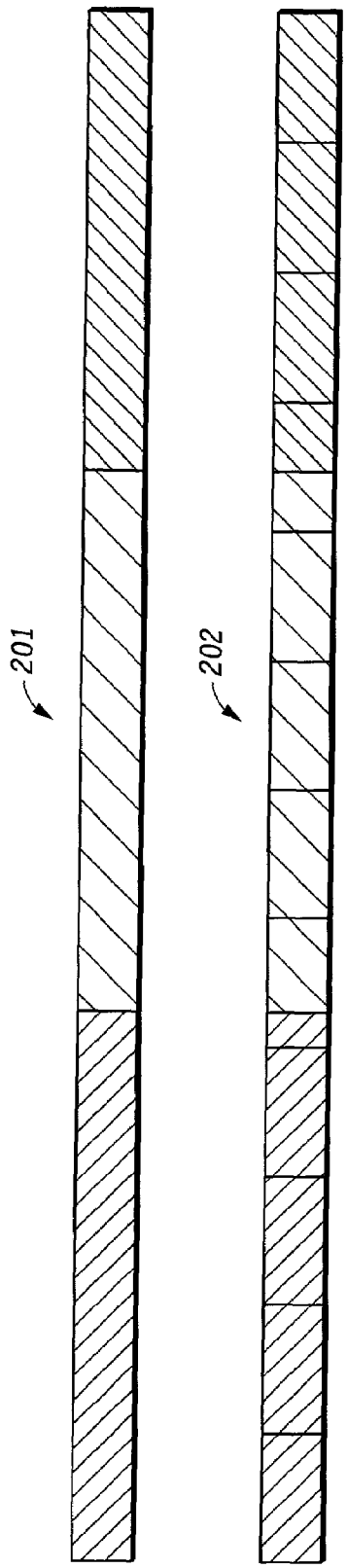
FIG. 2 illustrates data transmission within the communication system of FIG. 1 in accordance with the preferred embodiment of the present invention.

In current Code Division Multiple Access (CDMA) communication systems a Radio Link Protocol (RLP) is utilized for the link layer to transport data traffic between a mobile unit and infrastructure equipment. During typical data transmission Point to Point Protocol (PPP) is utilized on top of the RLP. In such situations, RLP fragments PPP packets into 20 millisecond frames that are transmitted over the air. This is illustrated in FIG. 2. As shown, PPP packets 201 are segmented into RLP frames 202 and transmitted over the air.

RLP is a NAK-based protocol in that once a bad frame has been received, receiving device 102 will request retransmission of the lost frame periodically until the frame is received, or until an indication is received from transmitting device 101 that the frame is aborted. Such a scenario is illustrated in FIG. 3.

Figure 3:
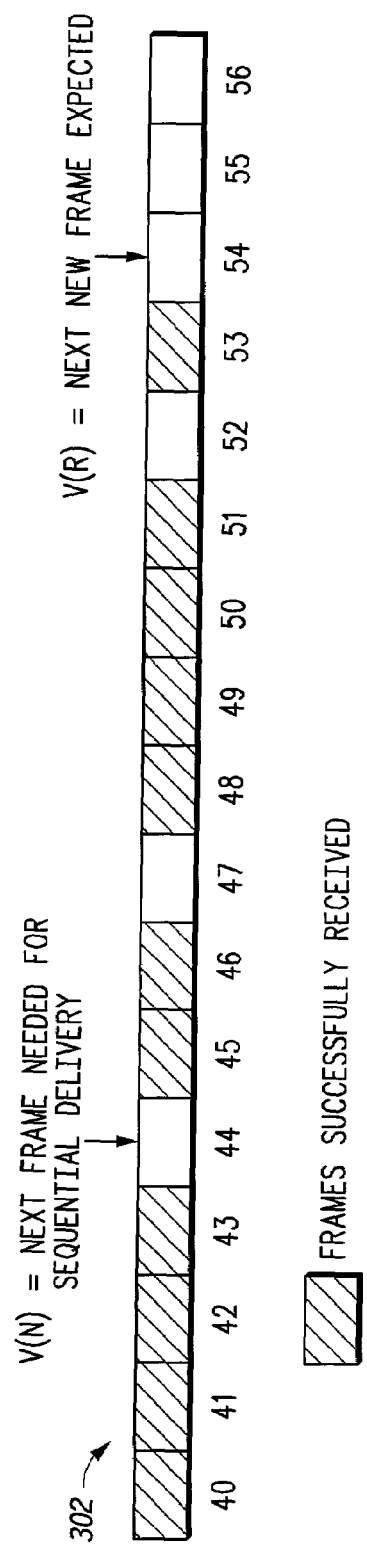
FIG. 3 illustrates data transmission within the communication system of FIG. 1 in accordance with the preferred embodiment of the present invention.

As shown in FIG. 3, frames 40-43, 45-46, 48-51, and 53 have been successfully received. In this example, frames 44, 47, and 52 have been poorly received. Because of this, RLP will request retransmission of these frames periodically.

Current RLP defines variables V(N) and V(R), with V(N) being equal to the next frame needed for sequential delivery of frames, and V(R) equal to the next new frame expected from the transmitter. V(N) is a variable that tells the receiver what frames have been received or aborted. In particular, all frames<V(N) are tagged as "received" by the receiver, and the receiver will fail to send a NAK for frames having values<V(N). (See IS-707 Section 3.1.2.2).

Implementing the above procedure into RLP requires that transmitting device 101 constantly update R, record the number of retransmission performed on each frame, determine whether the retransmission of a frame should be aborted, and communicate to receiving device 102 when a frame is aborted. In the scenario described in FIG. 3, V(N)=44 and V(R)=54. Thus, receiving device 102 will NAK frame 44. Upon the arrival of the NAK, loss-ratio estimator 105 will use the NAK to update the current loss-ratio estimate L and generator 104 will then adjust retransmission parameter R. At the same time, transmitter 103 will first examine whether frame 44 has already be retransmitted for R or more times. If so, transmitter 103 will not retransmit frame 44. Instead, it will communicate to receiving device 102 that frame 44 is aborted. If transmitter 103 finds that frame 44 has not be retransmitted for R times, it will retransmit frame 44 one more time. Upon the abortion of frame 44, V(N) is set by receiver 106 to the sequence number of the next missing data frame (i.e., frame 47).

Operation of Communication System Using an ACK-Based Protocol

In many existing communication systems an ACK-based protocol is utilized for the transportation of data traffic between a transmitting and receiving device. During typical data transmission, receiving device 102 will periodically report to transmitting device 101 on frames correctly received by sending back ACKs. Combining the information reported in the ACKs with its own data transmission record, transmitting device 101 will derive information on lost frames if there are any. In other words, in an ACK-based protocol the information on frames that are lost or poorly received is implicitly indicated in the ACKs. Once the lost frame(s) is identified through analyzing a newly arrived ACK, loss-ratio estimator 105 will update the current loss-ratio estimate L and generator 104 will then adjust retransmission parameter R. At the same time, for each lost frame identified, transmitter 103 will first examine whether the frame has already been retransmitted for R or more times. If so, transmitter 103 will not retransmit the frame, but instead will communicate to receiving device 102 indicating that the frame is aborted. Upon reception of the abortion indication, receiving device 102 will indicate the frame as received in its subsequent ACKs.

As shown in FIG. 3, frames 40–43, 45–46, 48–51, and 53 have been successfully received. In this example, frames 44, 47, and 52 have been poorly received or never arrived. Because of this, in its next ACK message, receiving device 102 will report the correct reception of all frames up to 43, frames 45 and 46, frames 48 to 51, and frame 53. When this ACK arrives at transmitting device 101, by examining the information carried in the ACK and its own transmission record, transmitting device 101 will determine that frames 44, 47, and 52 are not correctly received or are lost. This information on lost frames will then be used by estimator 105 to update L and generator 104 will then use the updated L to adjust R. At the same time, for each of the lost frames 44, 47, and 52, transmitter 103 will further examine whether the frame has already been retransmitted for R or more times, and if so, transmitter 103 will abort the frame and will indicate the abortion to receiving device 102. If the frame has not been retransmitted for R or more times, transmitter 103 will retransmit the lost frame one more time.

Figure 4:
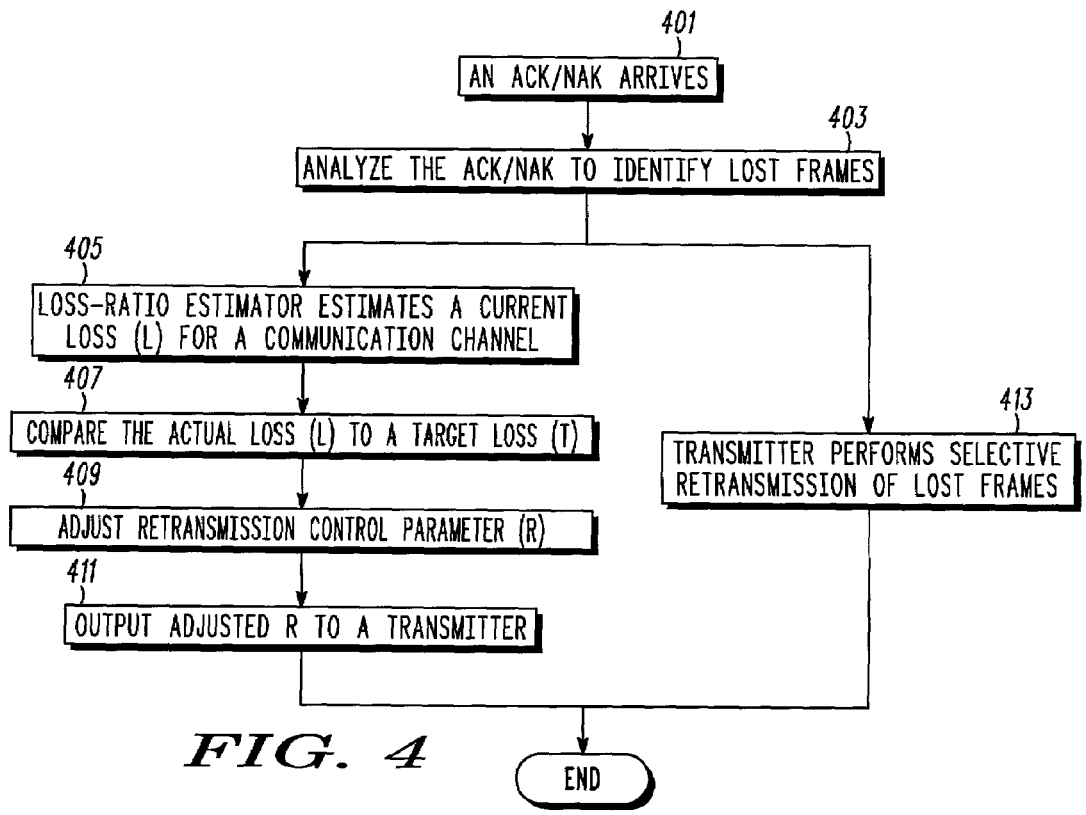
FIG. 4 is a flow chart showing operation of the transmitting device of FIG. 1 in accordance with the preferred embodiment of the present invention.

FIG. 4 is a flow chart showing operation of the transmitting device in the communication system of FIG. 1 in accordance with the preferred embodiment of the present invention. Although typical communication systems employ either an ACK or NAK protocol, the following description is given with the use of either protocol. The following description is not meant to imply that both an ACK and NAK are utilized simultaneously, but that either can be used.

The logic flow begins at step 401 where an ACK/NAK arrives at transmitting device 101. At step 403 the information carried in the ACK/NAK is analyzed to identify which frame(s) is lost. At step 405, loss-ratio estimator 105 estimates a current loss (L) for communication channel 108. Once the loss ratio is known, generator 104 compares the actual loss (L) to a target loss (T) (step 407). A retransmission control parameter (R) is adjusted by generator 104 (step 409) and output to transmitter 103 (step 411). At the same time, after the lost frame(s) is identified at step 403, transmitter 103 examines the lost frame and retransmit it if necessary (step 413).

Figure 5:
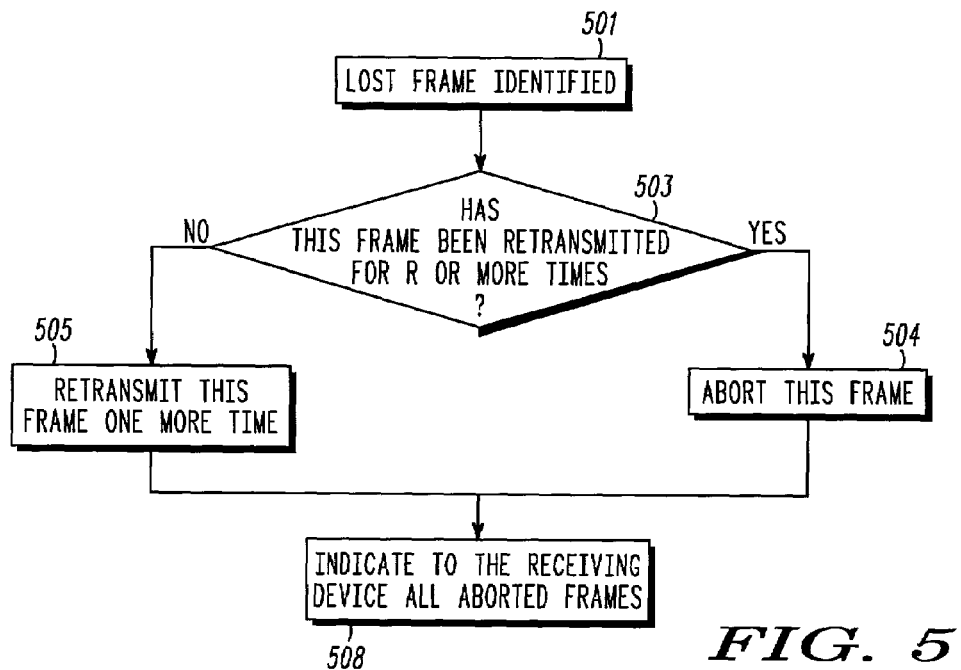
FIG. 5 is a flow chart showing those steps necessary to retransmit a lost frame in accordance with the preferred embodiment of the present invention.

FIG. 5 is a flow chart showing those steps necessary to retransmit a lost frame in accordance with the preferred embodiment of the present invention. It should be noted that the description that follows illustrates retransmission of a single lost frame, however one of ordinary skill in the art will recognize that in actuality multiple lost frames may be simultaneously identified, and each processed as follows:

At step 501 a lost frame is identified by estimator 105. The lost frame is first examined whether it has already been retransmitted for R or more times (step 503). If so, the lost frame is aborted and not be retransmitted (step 504), otherwise, the lost frame is retransmitted (step 505). After all the identified lost frames are either retransmitted or aborted, transmitter 103 indicates to receiving device 102 the frames that have been aborted (step 508).

By adjusting the retransmission control parameter (R), communication system 100 maintains a targeted loss ratio (T). Therefore, a user requiring a certain QoS can obtain that QoS without having to resort to a totally reliable transmission control protocol.

Figure 6:
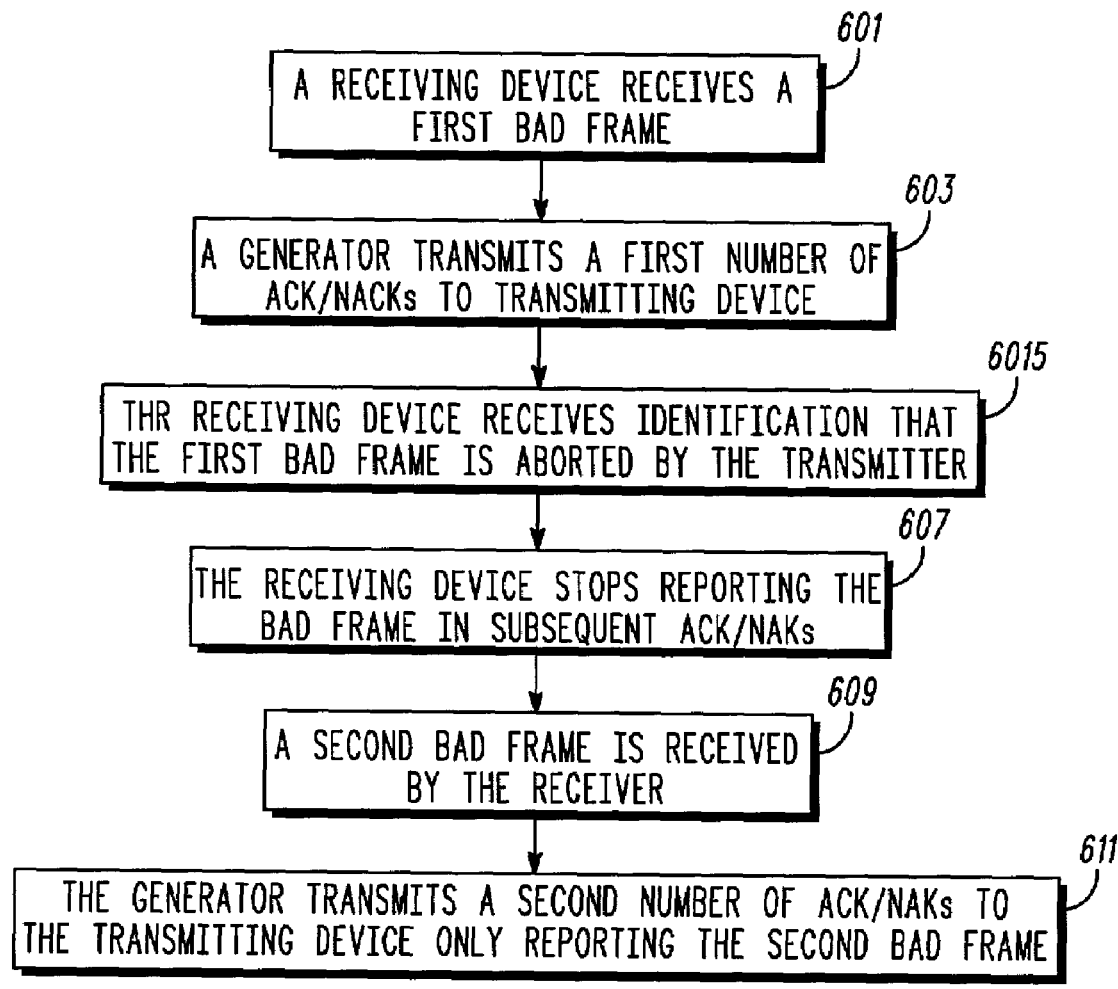
FIG. 6 is a flow chart showing operation of the receiving device of FIG. 1 in accordance with the preferred embodiment of the present invention.

FIG. 6 is a flow chart showing operation of receiving device 102 in accordance with the preferred embodiment of the present invention. The following logic assumes reception of bad frames that are not subsequently received correctly. The logic flow begins at step 601 where receiving device 102 receives a first bad frame. At step 603 generator 107 transmits a first number of ACK/NAKs to transmitting device 101. In particular, at step 603 generator 107 will periodically ACK/NAK a bad frame if the frame has not been correctly received. At step 605 the first bad frame is declared an aborted frame by transmitter 103 and the decision is indicated to receiver 106. The arrival of this indication causes generator 107 to stop reporting the first bad frame in all its subsequent ACK/NAKs (step 607). The logic flow continues to step 609 where a second bad frame is received by receiver 102. The logic flow continues to step 611 where generator 107 transmits a second number of ACK/NAKs to transmitting device 101 only reporting the second bad frame.

It should be noted that in the above description, the first and the second number of ACK/NAKs that are transmitted to transmitting device 101 may differ. In each case, the frame is declared aborted, however, a different number of ACK/NAKs were required to do so in each case. Because of this, a user requiring a certain QoS can obtain that QoS without having to resort to a totally reliable transmission control protocol. Because of this, the bandwidth resource of communication channel 108 which is often shared with other users can be saved and the additional data delay often associated with a totally reliable transmission control protocol can be avoided.

Figure 7:
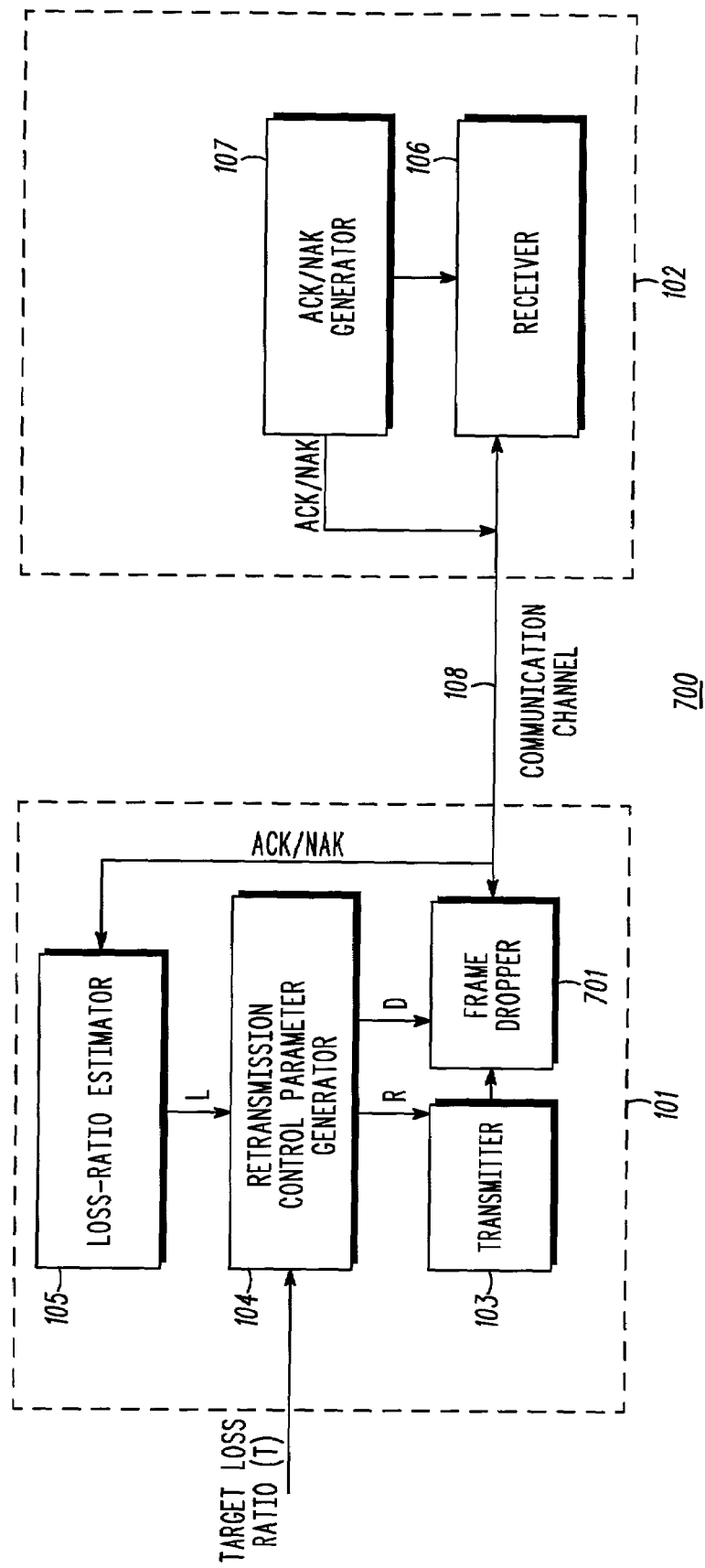
FIG. 7 is a block diagram of a communication system in accordance with an alternate embodiment of the present invention.

FIG. 7 is a block diagram of communication system 700 in accordance with an alternate embodiment of the present invention. In accordance with the alternate embodiment of the present invention, frame dropper 701 is introduced to receiving device 101. The purpose of frame dropper 701 is to randomly drop D percent of frames in order to maintain a targeted loss ratio (T). In other words, if loss-ratio estimator 105 determines that an actual loss is still less than target loss ratio (T), after having adjusted the retransmission control parameter R to 0, generator 104 instructs frame dropper 701 to randomly drop D percent of frames in order to further save bandwidth resource from communication channel 108. In many situations it will be necessary to both lower R and drop packets to maintain a target QoS. This is because the quality of a channel may be good even though R=0. In this situation, R cannot be decreased any further, and frame dropper 701 will periodically drop random frames to maintain a targeted QoS. Generator 104 will gradually increase D until the actual loss L is equal to the targeted loss ratio (T).

Operation of communication system 700 in accordance with the alternate embodiment of the present invention occurs as follows: Once the loss ratio is known, generator 104 compares the target loss ratio to the actual loss ratio and adjusts the retransmission control parameter (R) and instructs frame dropper 701 to drop frames according to the following logic:

Both R and D are set to 0 at initialization.
If L>T and D>0 then D is decreased,
If L>T and D=0 then R is increased,
If L<T and R>0 then R is decreased, and
If L<T and R=0 then D is increased.
L~T then R and D are unchanged.

Communication system 700 serves to maintain a targeted QoS loss ratio (T) by dropping frames when the retransmission control parameter is at its lowest value.

While the invention has been particularly shown and described with reference to a particular embodiment, it will be understood by those skilled in the art that various changes in form and details may be made therein without departing from the spirit and scope of the invention. For example, although the above description was given with respect to link-layer retransmission, one of ordinary skill in the art will recognize that the above description may be applied to any layer requiring retransmission of lost data packets. It is intended that such changes come within the scope of the following claims.

The invention claimed is:

1. A method for data transmission, the method comprising the steps of:
   receiving a first bad frame a first plurality of times;
   sending a first number of Acknowledgments (ACKS) or Negative Acknowledgments (NAKs) in response to the received first bad frames;
   declaring the first bad frame an aborted frame;
   receiving a second bad frame a second plurality of times;
   sending a second number of ACKs or NAKs in response to the received second bad frames, wherein the first and the second number of ACKs or NAKs differ; and
   declaring the second bad frame an aborted frame.

2. The method of claim 1 wherein the step of receiving the first bad frame comprises the step of receiving a first Radio Link Protocol (RLP) frame.

3. The method of claim 1 wherein the step of declaring the first bad frame an aborted frame comprises the step of declaring the first bad frame an aborted frame only after sending the first number ACKs or NAKs in response to the first bad frame.

4. A method for data transmission, the method comprising the steps of:
   receiving an acknowledgment (ACK) or negative acknowledgment (NAK);
   determining a loss ratio (L) based on the received ACK/NAK;
   comparing the loss ratio with a target loss ratio (T); and
   adjusting a retransmission parameter (R) based on the comparison, wherein the retransmission parameter comprises a number of times a particular frame is to be retransmitted prior to aborting the frame.

5. The method claim 4 wherein the step of adjusting R comprises the steps of increasing R when L>T, and decreasing R when L<T and R>0.

6. The method of claim 4 wherein the step of comparing the loss ratio with the target loss ratio comprises the step of comparing the loss ratio with a user specified loss ratio.

7. An apparatus comprising:
   a loss ratio generator having an ACK or NAK as an input and outputting an estimated channel loss (L); and
   a retransmission parameter generator having the estimated channel loss as an input and outputting a retransmission parameter (R) based on the estimated channel loss, wherein R comprises a number of retransmissions a frame undergoes prior to declaring the frame an aborted frame.

8. The apparatus of claim 7 wherein the retransmission parameter generator additionally has a target loss ratio (T) as an input and outputs R based additionally on T.

9. The apparatus of claim 8 wherein T is a user-specified value.

10. The apparatus of claim 7 wherein $$L = \frac{\text{Number of poor frames received in last 10 seconds}}{\text{Total number of frames transmitted in last 10 seconds}}.$$

11. The apparatus of claim 7 wherein if
L>T then R is increased,
L<T and R>0 then R is decreased,
L~T then R is unchanged.

12. The apparatus of claim 7 further comprising a frame dropper selectively dropping frames to maintain a targeted loss ratio (T).

13. An apparatus comprising:
   a receiver having a poor frame as an input;
   an ACK/NAK generator coupled to the receiver, the receiver outputting an ACK/NAK based on a targeted loss ratio (T), an actual channel loss ratio (L), and a retransmission parameter (R), wherein the retransmission parameter comprises a number of times a frame is ACK/NAKed prior to declaring the frame an aborted frame.

14. The apparatus of claim 13 wherein the actual channel loss ratio is calculated by a transmitter transmitting the poor frame to the receiver.

* * * * *